United States Patent Office 3,508,193
Patented Apr. 21, 1970

3,508,193
INDICATOR OF AIR-PRESSURE IN TYRES
Vilim Giovannelli and Nicolas Giovannelli, both of 756 Egipto St., Villa Martelli, Buenos Aires, Argentina
Filed May 8, 1967, Ser. No. 636,696
Int. Cl. B60c 23/04
U.S. Cl. 340—58                                      7 Claims

ABSTRACT OF THE DISCLOSURE

The indicator consists of two parts: one is fixed to the rotatable part of the wheel and the other is attached to a fixed part of the same or to a fixed part of he vehicle. The rotatable part consists of a closed casing divided by a membrane. One of the resulting chambers is connected to the tyre valve by means of a flexible tube which is provided with means for partially keeping open the said valve. The other chamber houses a spring-loaded element pressing against the membrane. This elements carries contacts which in their turn, under certain circumstances, contact a ring concentric with the hub of the wheel. The fixed part carries a spring-loaded contact in slidable engagement with the ring. This contact is connected to the alarm means and to the source of power. The changes in pressure reflect on the membrane in both ways putting into touch a contact of the spring-loaded element that presses against the membrane with the ring and thus closing the electrical circuit which excites the alarm means.

---

Figure 1:
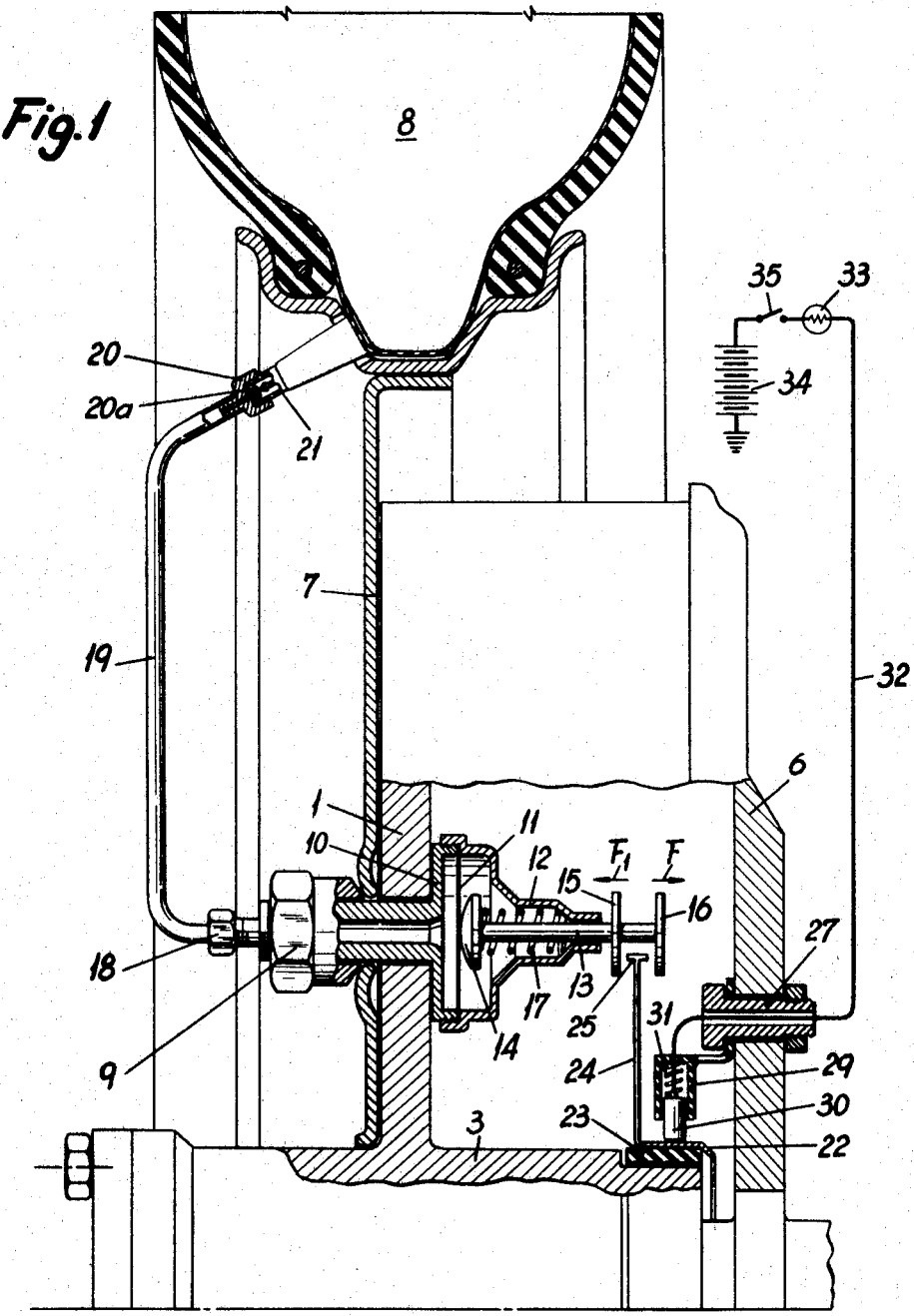

The present invention consists of an improved indicator of air-pressure in tyres.

The importance of correct air pressure in motor vehicle tyres is well known, especially in the case of heavy trucks, and the like, whose tyres have to withstand considerable strains.

Trials have been made of various alarm devices fixed to the valves of pneumatic tyres, but with poor results, as these devices were unduly exposed to mud and water and their attachment to the indicating means was complicated, as the device rotated with the wheel and consequently presented considerable difficulty in the sliding connection with the frame of the vehicle.

A different type of device that was connected to the valve of the tyre consisted of a cylinder within which a piston moved in or out of equilibrium according to any difference in pressure between the air in the tyre and an opposing spring. Any movement of the piston was transmitted to suitable electric contacts by means of a lever that extended outside the cylinder casing. However, any device having piston means cannot be made perfectly air-tight and the unavoidable leakage must lead to eventual deflation of the tyre on one hand with an increase of pressure on the other face of the piston, thus making any indication inaccurate. There would also be an escape of air at the opening where the lever extended outside the cylinder casing.

These difficulties have been overcome by the present invention, which presents an indicator of air-pressure variations that is well protected from water and mud and can easily be connected to the alarm means without any loss of air pressure.

The alarm means described in this specification and illustrated in the attached drawings consist of electric (flash battery) lamps, but the device can be connected to acoustic signals, such as a horn or buzzer etc., with or without said electric lamps.

The object of the present invention is an improved indicator of air-pressure changes in tyres of vehicles, which is of the type that consists of a portion fixed to the rotating part of the wheel and which communicates with the interior of the tyre and carries an element that changes its position, in accordance with the variations in the pressure in said tyre, from a normally neutral position to one in which an electric circuit is closed in the case of either low or high pressure, and another portion attached to the stationary part of the vehicle, provided with an electric contact that is in constant contact with a conductor on the rotating portion, said second portion being connected electrically with the source of electric current. This indicator is characterized in that a bushing runs through the tyre rim and the brake drum and carries a casing divided into two compartments by a membrane, one of said compartments being connected to the interior of the tyre by means of a flexible tube which is screw fitted to the compartment and to the tyre valve, at which latter union means for opening the tyre valve are provided, the other said compartment containing an elongated element with an enlarged end which is permanently pressed against said membrane by an elastic means, said elongated element being adapted to close the electric circuit upon being displaced either by the membrane or by the elastic means; the elements attached to the stationary part of the vehicle including a contact that is in sliding engagement with an annular member connected electrically to the elements attached to the rotating part of the wheel.

Figure 2:
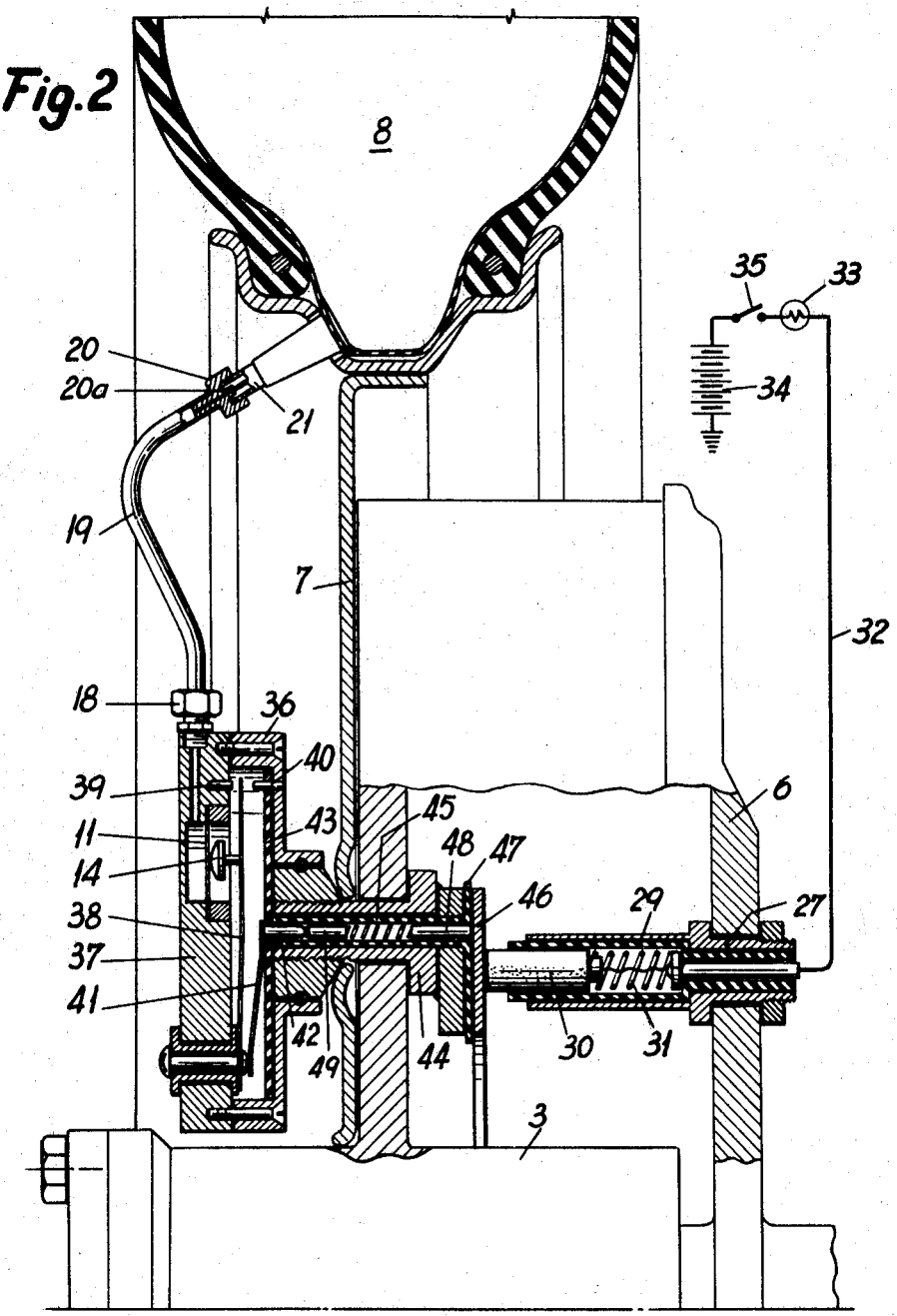

To explain and describe this invention more clearly a prepared embodiment is shown in the drawings attached, wherein FIGURE 1 is a side view, partly in a vertical cross-section through the centre of a wheel with a portion of the tyre, and FIGURE 2 shows a modified embodiment of the invention.

In the drawings a brake-drum 1 and the hub 3 of a wheel turn within a stationary bearing on axis 4. The rim 7 fixed to the brake-drum 1 carries the type 8. All these elements are illustrated schematically as their dimensions vary in different motor vehicles.

The brake-drum 1 has a perforation which runs through the tyre-rim 7 and a bushing 9 is sealed herein, with a union of the type used for tyre-valves. The inner end of the bushing 9, i.e. the end which is inside the chamber formed by the drum 1 and the fixed outer cover 6 is bell-shaped as indicated by 10 and the bell-shaped portion serves to make airtight contact with the brake-drum 1 and with the cone-shaped housing 12 and to form an air-tight seat for the membrane 11 which is firmly pressed against the edges of the cover 10 and sealed by suitable means.

A plunger element 13 is slidably supported within the cone-shaped casing 12 closed by the membrane 11 against which one enlarged end 14 is pressed by a calibrated spring 17 while the other end of said plunger 13 extends through a bearing that forms the end of the conical casing 12 and carries two electric contacts 15 and 16 spaced from each other, said contacts are preferably shaped similarly to the conventional electric switch contacts, but can also be of different shapes. The spring 17 presses the head 14 of the plunger 13 continuously against the membrane 11.

In another forseen modification, instead of making a special orifice in the brake-drum and the tyre rim, one of the bolts holding the rim 7 to the drum 1 is withdrawn and replaced by the bushing 9 which carries a screw thread that serves for attachment as well as for the object of this invention.

The outer end of bushing 9 carries a hollow, rotatable union 18 similar to the type used on inflators and this carries a flexible tube 19 the further end of which has another rotatable union 20 which is screwed to the outer portion of the tyre-valve 21. The rotatable union 20 consists of a screw cap and holds a central tube 20a connected to a perforation in said screw cap and thus providing a passage for the air from the tyre valve 21 to the flexible tube 19. The tube 20a is adapted to press against the valve stem of the tyre valve 21 and to hold same in partly open position and thus connect the interior of the tyre 8 with the flexible tube 19.

A metal ring 22 is fixed upon the hub 3 of the wheel and is insulated from said hub by means of an insulating washer 23. This metal ring 22 bears an extended flange 24, also of metal, which has an outer rim 25 that forms an electric contact between the two contacts 15 and 16. Rim 25 is normally separated from contacts 15 and 16.

An adequate opening in the fixed outer cover 6 that closes the brake drum 1 carries a bushing 27. This bushing 27, which can be outwardly screw cut and is of non-conducting material, has an inner flanged end that serves to hold an angle piece 28 which carries a cylindrical casing 29 also of non-conducting material, within which there is a slidably held carbon rod 30 that is pushed outwards by means of a spring 31 disposed within said cylindrical casing 29 to make a continuous sliding contact with the metal ring 22. The carbon rod 30 at its inner end is attached to an insulated conductor 32 which passes through the bushing 27 and is connected to the alarm means which are schematically shown as an electric flash light 33. This lamp 33 is connected in turn with the cell 34 after passing the switch 35.

In order to protect the moving parts of this device, such as the triple contacts formed by the elements 15 and 16 and the flange 25, as well as the carbon rod 30 and the metal ring 21, these parts can be enclosed in suitable casings of different shapes that are not shown in the drawings, and thus protected from splashes of water that might damage these parts.

The indicator acts as follows: When the air pressure in the tyre 8 is normal, this pressure, acting upon the membrane 11 through the conduit 19 and the unions described above, is just sufficient to counteract the force of the calibrated spring 17 and thus ensure that the two contacts 15 and 16 fixed upon the plunger 13 retain their positions spaced away from the contact 25 on the flange of the metal ring 22. All these parts being attached to the rotating portion of the wheel, turn with same and always retain their respective positions. The carbon contact rod 30 is in sliding touch with the metal ring 22, as this ring is in motion while the carbon contact is stationary. The spring 31 serves to compensate the wear of the carbon 30 due to the friction arising from this moving contact. The switch 35 is kept closed, so that the indicator lamp 33 is connected to one of the poles of the battery 34, this being the positive pole in the drawing and the circuit is completed by connecting the negative pole of the battery to the frame or chassis of the car.

When the air pressure in the tyre increases, this increase acts upon the membrane 11 through the conduit 19 and overcomes the counterpressure of the spring 17 thus pushing the plunger 13 outwards in the direction shown by the arrow F and thereby making contact between the part 15 and the contact 25 which closes the circuit through the carbon rod 30 and lights the lamp 33.

After removal of the cause of excess pressure, the spring 17 again balances the membrane 11 into normal equilibrium and the contact 15 moves away from contact 25 thereby breaking the circuit and putting out the lamp 33.

If, on the other hand, there is a loss of pressure in the tyre 8 the calibrated spring 17 is able to push the membrane 11 inwards and the plunger 13 moves in the direction of arrow $F_1$, thus bringing the outer contact 16 into touch with contact 25, closing the circuit and lighting the lamp 33. Upon reestablishment of normal pressure, the membrane 11 is able to push back the spring-powered plunger 13 and the equilibrium, thus reestablishing the normal spacing between contacts 16 and 25, breaks the circuit.

Each wheel of the vehicle must be equipped with an independent device and these several devices may be connected in parallel with a single luminous and/or acoustic indicator, or preferably having a separate luminous indicator for each wheel, all lights being mounted on one panel, so that the driver can tell which tyre needs attention, while connecting all the independent lamps to a single acoustic alarm so that the driver is advised and instructed at the same time.

In another modification of the same idea the device that transmits the differences in pressure to the electric elements consists of a closed casing 36 having an orifice that permits the attachment of the end of the flexible tube 19 by means of a rotatable unit 18. This casing 36 is divided internally by a wall 37 into two chambers, the wall 37 having an opening that is hermetically closed by an elastic membrane 11. The screwed union 18 provides communication between the tyre 8 and one of the chambers, while the other chamber of the casing 36 contains an elastic plate 38 bearing a short stud with a large head 14 that makes contact with the membrane 11. The one end of this elastic plate 38 is fixed to the dividing wall 27 by means of a screw or other metal means while the other end of said flexible plate 38 is free and is normally disposed between two metal contacts 39 and 40 facing but spaced from each other and forming electric conductors to earth. The fixed end of the flexible plate 38 is connected by means of a conductor 41 to another conductor 42 which pierces the bottom wall of the casing 36, which is lined with an insulating material 43, and protrudes into the bushing 44 which passes through the web of the rim 7 and the drum 1 of the wheel. The interior of this bushing 44 is lined with insulating material 45. A preferred form of attaching the casing 36 to the bushing 44 is shown in FIGURE 2 of the drawings which also shows the latter is fixed to the outer face of the wheel, but this form of attachment can vary. The end of the bushing 44 that extends into the brake-drum 1 carries a metal ring 46 which is concentric with the hub 3 of the wheel and insulated from the bushing 44 by an insulating washer 47. A conductor 48 passes through the insulating washer 47 unites the ring 46 electrically with the conductor 42 by means of another conductor 49 which is slidably held within the bushing 44 and pressed by the spring 50 thus ensuring a good, flexible electric contact continuously between the ring 46 and the contact 42, that is able to withstand the shocks to which the wheel is submitted.

As already described in the first case, the fixed cover 6 of the drum is pierced by a bushing 27 which carries a cylindrical casing 29 within which a carbon rod 30 is slidably supported and impelled by a spring 31 so as to make continuous, sliding contact with the ring 46. The action of the device illustrated in FIGURE 2 being identical with that of the former.

In practice the carbon rod 30 can be replaced by one of stainless steel, brass or other metal that is a good conductor of electricity.

It should be noted that in those cases where there is no fixed cover 6 the elements which are described as stationary should be supported by a fixed part of the vehicle.

We claim:
1. An improved indicator of air-pressure changes in tyres of vehicles, which is of the type that consists of a portion fixed to the rotating part of the wheel and which communicates with the interior of the tyre and carries an element that changes its position, in accordance with the variations in the pressure in said tyre, from a normally neutral position to one in which an electric circuit is closed in the case of either low or high pressure, and another portion attached to the stationary part of the vehicle, provided with an electric contact that is in constant contact with a conductor on the rotating portion, said second portion being connected electrically with the alarm means and with the source of electric current, characterized in that a bushing runs through the tyre rim and the brake-drum and carries a casing divided into two compartments, said compartments being divided by an air-tight membrane, one of said compartments being connected to the interior of the tyre by means of a flexible tube which is screw fitted to the compartment and to the tyre valve, at which latter union, means for partially opening the tyre valve are provided, the other said compartment containing an elongated element with an enlarged end which is permanently pressed against said membrane by an elastic means, said elongated element being adapted to close the electric circuit upon being displaced either by the membrane or by the elastic means; the elements atttached to the stationary part of the vehicle including a contact that is in sliding engagement with an annular member connected electrically to the elements attached to the rotating part of the wheel.

2. An improved indicator of air-pressure changes in accordance with claim 1, characterized in that the contact attached to the stationary part of the vehicle consists of a plunger housed in a cylindrical casing and a spring which is provided between the bottom of said casing and the end of the plunger to keep the plunger in sliding engagement with the annular member of the rotating part.

3. An indicator of air-pressure changes in accordance with claim 1, characterized in that the alarm means consist of at least one electric lamp.

4. An indicator of air-pressure changes in accordance with claim 1, characterized in that the alarm consists of acoustic means.

5. An indicator of air-pressure changes in accordance with claim 1, characterized in that the alarm consists of a combination of luminous and acoustic means.

6. An improved indicator of air-pressure changes in pneumatic tyres, consisting of an insulated bushing which runs through the rim and the brake-drum of the wheel, a flexible tube which is attached at one end to the outer end of said bushing and at the other end to the tyre valve, said other end being provided with means to keep partly open the tyre valve, the inner end of the bushing being flanged and closed by a membrane which is held in place by a conically shaped casing with a pointed end, within which casing a plunger element is pressed by a calibrated spring that holds one end of said plunger element against said membrane while the other end of said plunger element extends beyond the pointed end of the conically shaped casing and bears two electric contacts at a fixed distance from each other; a metal ring is insulated attached to the hub of the wheel and is provided with a radial extension that has an electric contact at is outer end, which said contact is normally stationed between the two contacts on the plunger element, spaced away from both the latter and revolves with said contacts at the same speed; an electric conductor pierces said brake-drum and is carried by an insulating bushing which supports an insulated cylindrical housing containing a contact, a spring being provided between the bottom of said housing and the end of said plunger contact to keep same in sliding engagement with the annular member of the rotating part, thereby creating a circuit with the alarm means and the source of electric energy, said circuit remaining open normally and becoming closed only when a change of pressure in the tyre takes place.

7. In an indicator of air-pressure in pneumatic tyres of vehicles, a closed casing attached to the outer side of the brake-drum and piercing same as well as the tyre rim by means of a screwed bushing, said casing being divided into two chambers by means of a metal wall having an opening closed by means of a membrane; one of said chambers being in connection with the interior of the tyre by means of a flexible tube, one end of which is screwed to said chamber and the other end to the tyre valve, at which end a device is provided that is adapted to open said tyre valve partially; the other chamber of said casing having a flexible plate, one end whereof is fixed to the wall of said chamber while the other end is free and is normally disposed between two spaced contacts, said plate bearing a stud with an enlarged head that is in permanent contact with said membrane, the fixed end of said flexible plate being attached to an electric conductor that passes through said insulated bushing and consists of several elements in close contact caused by a spring, the further portion of said conductor extending into the interior of the brake drum where contact is made with a metal ring attached to the end of the insulated bushing and disposed concentrically to the axis of rotation of the wheel, while a fixed part of the wheel or vehicle is pierced by another insulated bushing which carries an insulated casing for a sliding plunger element in contact with said ring on the revolving portion, a spring housed inside the casing forming the means to keep the plunger in sliding engagement with the ring, said plunger element being connected to the alarm means by an insulated conductor and to the source of electric energy, this circuit remaining open under normal conditions and becoming closed only when the air-pressure in the tyre suffers a change.

References Cited

UNITED STATES PATENTS 2,524,968   10/1950   Eriksen et al. \_\_ 200—61.25 XR
3,430,196   2/1969   Dalton _____ 340—58

ALVIN H. WARING, Primary Examiner

U.S. Cl. X.R.

200—61.25